US011235329B2

(12) United States Patent
Meketa et al.

(10) Patent No.: US 11,235,329 B2
(45) Date of Patent: Feb. 1, 2022

(54) SYSTEMS AND METHODS FOR SUBSTANCE DETECTION USING THERMALLY STABLE COLLECTION DEVICES

(71) Applicant: Rapiscan Systems, Inc., Torrance, CA (US)

(72) Inventors: Matthew Meketa, Schenectady, NY (US); Hanh Lai, Arlington, MA (US); Tracy Lynn Paxon, Niskayuna, NY (US); Bing Li, Clifton Park, NY (US)

(73) Assignee: Rapiscan Systems, Inc., Torrance, CA (US)

( * ) Notice: Subject to any disclaimer, the term of this patent is extended or adjusted under 35 U.S.C. 154(b) by 635 days.

(21) Appl. No.: 16/101,014

(22) Filed: Aug. 10, 2018

(65) Prior Publication Data

US 2019/0046974 A1   Feb. 14, 2019

Related U.S. Application Data

(60) Provisional application No. 62/543,589, filed on Aug. 10, 2017.

(51) Int. Cl.
*B01L 3/00* (2006.01)
*G01N 1/02* (2006.01)
(Continued)

(52) U.S. Cl.
CPC ............ *B01L 3/5029* (2013.01); *B01L 3/505* (2013.01); *G01N 1/02* (2013.01); *G01N 25/12* (2013.01); *B01L 2200/10* (2013.01); *B01L 2300/12* (2013.01); *G01N 1/44* (2013.01); *G01N 2001/022* (2013.01); *G01N 2001/028* (2013.01)

(58) Field of Classification Search
None
See application file for complete search history.

(56) References Cited

U.S. PATENT DOCUMENTS

| 3,067,560 A | 12/1962 | Frederick |
| 3,705,480 A | 12/1972 | Wireman |

(Continued)

FOREIGN PATENT DOCUMENTS

| AT | 303589 T | 9/2005 |
| AT | 480769 T | 9/2010 |

(Continued)

OTHER PUBLICATIONS

International Search Report for PCT/US18/46268, dated Oct. 25, 2019.

(Continued)

*Primary Examiner* — Matthew D Krcha
*Assistant Examiner* — Brittany I Fisher
(74) *Attorney, Agent, or Firm* — Novel IP (57) ABSTRACT

The present disclosure is directed to methods and systems for detecting a substance of interest. The methods and systems include collecting the substance of interest on a collection device comprising an inert fiber material and a siloxane resin. The systems and methods further include heating the collection device in a desorber, wherein heating the device releases the substance of interest from the device, performing an analysis of the substance of interest, and detecting the substance of interest.

17 Claims, 5 Drawing Sheets

(51) Int. Cl.
*G01N 25/12* (2006.01)
*G01N 1/44* (2006.01)

(56) References Cited

U.S. PATENT DOCUMENTS

| | | | |
|---|---|---|---|
| 4,858,335 A | 8/1989 | Roth | |
| 5,350,442 A | 9/1994 | Thelen | |
| 5,491,337 A | 2/1996 | Jenkins | |
| 5,554,846 A | 9/1996 | Regiec | |
| 5,719,392 A | 2/1998 | Franzen | |
| 5,970,804 A | 10/1999 | Robbat, Jr. | |
| 6,211,516 B1 | 4/2001 | Syage | |
| 6,225,623 B1 | 5/2001 | Turner | |
| 6,326,615 B1 | 12/2001 | Syage | |
| 6,329,653 B1 | 12/2001 | Syage | |
| 6,397,658 B1* | 6/2002 | Villettaz | G01N 1/405 422/69 |
| 6,534,765 B1 | 3/2003 | Robb | |
| 6,630,664 B1 | 10/2003 | Syage | |
| 6,642,513 B1 | 11/2003 | Jenkins | |
| 6,690,005 B2 | 2/2004 | Jenkins | |
| 6,708,572 B2 | 3/2004 | Jenkins | |
| 6,737,642 B2 | 5/2004 | Syage | |
| 6,765,198 B2 | 7/2004 | Jenkins | |
| 6,815,670 B2 | 11/2004 | Jenkins | |
| 6,831,273 B2 | 12/2004 | Jenkins | |
| 6,840,122 B1 | 1/2005 | Jenkins | |
| 7,014,683 B2 | 3/2006 | Vierling | |
| 7,047,829 B2 | 5/2006 | Napoli | |
| 7,109,476 B2 | 9/2006 | Hanold | |
| 7,119,342 B2 | 10/2006 | Syage | |
| 7,141,786 B2 | 11/2006 | McGann | |
| 7,161,144 B2 | 1/2007 | Syage | |
| 7,196,325 B2 | 3/2007 | Syage | |
| 7,253,727 B2 | 8/2007 | Jenkins | |
| 7,299,710 B2 | 11/2007 | Syage | |
| 7,320,725 B2 | 1/2008 | Arno | |
| 7,338,638 B2 | 3/2008 | McGann | |
| 7,361,206 B1 | 4/2008 | Jahn | |
| 7,401,498 B2 | 7/2008 | Syage | |
| 7,448,248 B2 | 11/2008 | Carey | |
| 7,456,393 B2 | 11/2008 | Napoli | |
| 7,528,367 B2 | 5/2009 | Haigh | |
| 7,541,577 B2 | 6/2009 | Davenport | |
| 7,594,422 B2 | 9/2009 | Perry | |
| 7,594,447 B2 | 9/2009 | Napoli | |
| 7,663,099 B2 | 2/2010 | Reda | |
| 7,721,588 B2 | 5/2010 | Perry | |
| 7,799,567 B1 | 9/2010 | Call | |
| 7,856,898 B2 | 12/2010 | Carey | |
| 7,880,137 B2 | 2/2011 | McGann | |
| 8,161,830 B2 | 4/2012 | Boudries | |
| 8,186,234 B2 | 5/2012 | Syage | |
| 8,288,735 B2 | 10/2012 | Syage | |
| 8,402,842 B2 | 3/2013 | Syage | |
| 8,434,375 B1 | 5/2013 | Syage | |
| 8,614,582 B2 | 12/2013 | Syage | |
| 8,686,355 B2 | 4/2014 | Patterson | |
| 8,723,111 B2 | 5/2014 | Syage | |
| 8,857,278 B2 | 10/2014 | Syage | |
| 8,866,073 B2 | 10/2014 | Goedecke | |
| 8,952,327 B2 | 2/2015 | Patterson | |
| 9,147,565 B1 | 9/2015 | Goedecke | |
| 9,354,153 B2 | 5/2016 | Syage | |
| 9,482,655 B2 | 11/2016 | Vilkov | |
| 9,528,969 B2 | 12/2016 | Shaw | |
| 9,558,924 B2 | 1/2017 | Syage | |
| 9,683,981 B1 | 6/2017 | Vilkov | |
| 9,689,857 B1 | 6/2017 | Vilkov | |
| 9,726,655 B2 | 8/2017 | Syage | |
| 9,766,218 B2 | 9/2017 | Lai | |
| 9,789,434 B1 | 10/2017 | Lai | |
| 2003/0164091 A1 | 9/2003 | Hill | |
| 2004/0089799 A1 | 5/2004 | Kawato | |
| 2004/0262512 A1 | 12/2004 | Tobita | |
| 2005/0061964 A1 | 3/2005 | Nagano | |
| 2007/0028670 A1 | 2/2007 | Bonne | |
| 2008/0191129 A1 | 8/2008 | Makarov | |
| 2009/0084201 A1 | 4/2009 | Almirall | |
| 2009/0152458 A1 | 6/2009 | Vilkov | |
| 2009/0159790 A1 | 6/2009 | Kostiainen | |
| 2010/0058924 A1* | 3/2010 | Harvey | B01J 20/3293 95/88 |
| 2011/0272571 A1 | 11/2011 | Kenttaemaa | |
| 2012/0037797 A1 | 2/2012 | Li | |
| 2012/0112061 A1 | 5/2012 | Morokuma | |
| 2014/0264002 A1 | 9/2014 | Goedecke | |
| 2014/0322518 A1* | 10/2014 | Addleman | C09D 183/04 428/304.4 |
| 2015/0285780 A1 | 10/2015 | Kelley | |
| 2016/0282304 A1 | 9/2016 | Vilkov | |
| 2017/0103880 A1 | 4/2017 | Syage | |
| 2017/0213715 A1 | 7/2017 | Davila | |
| 2017/0261483 A1 | 9/2017 | Vilkov | |
| 2017/0261484 A1 | 9/2017 | Vilkov | |
| 2017/0284977 A1 | 10/2017 | Rogers | |
| 2017/0309463 A1 | 10/2017 | Vilkov | |
| 2018/0158665 A1 | 6/2018 | Eiceman | |
| 2018/0164189 A1 | 6/2018 | Bilodeau | |
| 2018/0172635 A1 | 6/2018 | Lai | |
| 2018/0172650 A1 | 6/2018 | Platow | |
| 2018/0182603 A1 | 6/2018 | Schmidt | |
| 2018/0182604 A1 | 6/2018 | Lai | |
| 2018/0283993 A1 | 10/2018 | Shaw | |
| 2018/0284081 A1 | 10/2018 | Shaw | |
| 2018/0356320 A1 | 12/2018 | Romanov | |
| 2019/0011421 A1 | 1/2019 | Rogers | |
| 2019/0046974 A1 | 2/2019 | Meketa | |
| 2019/0204274 A1 | 7/2019 | Eiceman | |
| 2019/0228959 A1 | 7/2019 | Verkerk | |

FOREIGN PATENT DOCUMENTS

| | | |
|---|---|---|
| CA | 2153371 C | 3/1999 |
| CA | 2436256 C | 6/2007 |
| CA | 2382823 C | 11/2007 |
| CA | 2362449 C | 10/2008 |
| CA | 2411532 C | 4/2010 |
| CA | 2285153 C | 5/2010 |
| CA | 2479875 C | 2/2011 |
| CA | 2538709 C | 2/2013 |
| CA | 2790430 A1 | 3/2013 |
| CA | 2807894 A1 | 9/2013 |
| CA | 2620405 C | 7/2014 |
| CA | 2548177 C | 9/2014 |
| CA | 2844222 A1 | 9/2014 |
| CA | 2845959 A1 | 9/2014 |
| CA | 2688352 C | 6/2015 |
| CA | 2644937 C | 11/2015 |
| CA | 2904479 A1 | 3/2016 |
| CA | 2910780 A1 | 4/2016 |
| CA | 2913931 A1 | 6/2016 |
| CA | 2915785 A1 | 6/2016 |
| CA | 2924580 A1 | 9/2016 |
| CA | 2647651 C | 11/2016 |
| CA | 2738053 C | 5/2017 |
| CA | 2959791 A1 | 9/2017 |
| CA | 2959796 A1 | 9/2017 |
| CA | 2962154 A1 | 9/2017 |
| CA | 2964147 A1 | 10/2017 |
| CN | 101093211 A | 12/2007 |
| CN | 101120247 A | 2/2008 |
| CN | 100445767 C | 12/2008 |
| CN | 101600960 A | 12/2009 |
| CN | 103308590 A | 9/2013 |
| CN | 103367092 A | 10/2013 |
| CN | 103650102 A | 3/2014 |
| CN | 105738461 A | 7/2016 |
| CN | 107037114 A | 8/2017 |
| CN | 107167334 A | 9/2017 |
| CN | 107167335 A | 9/2017 |
| CN | 107271254 A | 10/2017 |
| DE | 69528418 T2 | 1/2003 |
| DE | 69926965 T2 | 6/2006 |

(56) References Cited

FOREIGN PATENT DOCUMENTS

| | | |
|---|---|---|
| EP | 1048540 A1 | 11/2000 |
| EP | 1517129 A2 | 3/2005 |
| EP | 2368102 A2 | 9/2011 |
| EP | 2587259 A1 | 5/2013 |
| EP | 2637013 A2 | 9/2013 |
| EP | 2778650 A2 | 9/2014 |
| EP | 2778669 A1 | 9/2014 |
| EP | 2884254 A1 | 6/2015 |
| EP | 3015858 A1 | 5/2016 |
| EP | 3032570 A2 | 6/2016 |
| EP | 3040717 A1 | 7/2016 |
| EP | 1938078 B1 | 3/2017 |
| EP | 1297554 B1 | 4/2017 |
| EP | 3182111 A1 | 6/2017 |
| ES | 2183855 | 4/2003 |
| FR | 692712 A | 11/1930 |
| GB | 992782 A | 5/1965 |
| GB | 2075578 A | 11/1981 |
| GB | 2496286 A | 5/2013 |
| GB | 2536076 A | 9/2016 |
| JP | 3045655 B2 | 5/2000 |
| JP | 2006064325 | 3/2006 |
| WO | 0209847 A2 | 2/2002 |
| WO | 2008060666 A2 | 5/2008 |
| WO | 2009023361 A2 | 2/2009 |
| WO | 2013068026 A1 | 5/2013 |
| WO | 2019231483 A1 | 12/2019 |

OTHER PUBLICATIONS

Written Opinion of the International Searching Authority for PCT/US18/46268, dated Oct. 25, 2019.

Cody et al., "Versatile New Ion Source for the Analysis of Materials in Open Air under Ambient Conditions", Anal. Chem., 2005, vol. 77, pp. 2297-2302.

\* cited by examiner

SYSTEMS AND METHODS FOR SUBSTANCE DETECTION USING THERMALLY STABLE COLLECTION DEVICES

CROSS-REFERENCE

The present application relies on U.S. Patent Provisional Application No. 62/543,589, entitled "Systems and Methods for Substance Detection Using Thermally Stable Collection Devices" and filed on Aug. 10, 2017, for priority. The aforementioned application is incorporated herein by reference in its entirety.

FIELD

The embodiments described herein relate generally to detection techniques for chemical substances, and, more particularly, to collecting a substance of interest with a collection device that exhibits thermal stability as well as flexibility. More specifically, the methods and systems include collecting a substance of interest with a collection device comprising at least one inert fiber material coated with a siloxane resin. The systems and methods further include heating the collection device to release the substance of interest and performing an analysis on the substance of interest to detect the substance of interest.

BACKGROUND

Certain substances of interest (e.g., narcotics, energetic materials, and explosives) have low volatilities making their detection a challenge using conventional trace detection systems and methods. In some instances, it is desirable to utilize a thermally stable collection device that is able to withstand the high desorption temperatures required to volatilize the substance of interest for improved detection. Conventional sample swabs are subject to thermal decomposition at these higher temperatures (up to about 450° C.). It is additionally advantageous to maintain a certain degree of flexibility (i.e., mechanical flexibility that includes bending without cracking the resin) of the collection device for effective collection of a sample containing a substance of interest (e.g., surface particles).

There is a need, therefore, for trace detection systems and methods that utilize a flexible and thermally stable collection device to collect a sample containing a substance of interest, the substance of interest being subsequently released by heating the collection device at high temperatures. The present disclosure achieves these benefits by utilizing collection devices including an inert, thermally stable fiber material (for example, one that is stable at temperatures above approximately 250° C. and up to approximately 450° C.) coated with a non-slippery, yet flexible, resin that efficiently picks up surface particles. In particular, efficient sample collection and desorption may be achieved through contact with a thermally stable and flexible collection device as described herein, such as one comprising an inert fiberglass material coated with a siloxane resin.

SUMMARY

The following embodiments and aspects thereof are described and illustrated in conjunction with systems, tools and methods, which are meant to be exemplary and illustrative, and not limiting in scope. The present application discloses numerous embodiments.

The present specification discloses a collection device for collecting a substance of interest, the collection device comprising an inert fiber material and a siloxane resin.

Optionally, the fiber material comprises at least one of a woven and a non-woven glass material.

The collection device may be thermally stable up to a temperature of about 450° C.

Optionally, the collection device is configured to release the substance of interest when heated.

Optionally, the siloxane resin comprises at least one substituent selected from the group consisting of methyl, phenyl, and hydroxyl groups. Optionally, the flexibility of the collection device is decreased as a ratio of phenyl to methyl groups in the siloxane resin is increased.

Optionally, the fiber material is coated with a concentration of from about 10% to about 80% of the siloxane resin, by weight of the collection device.

Optionally, the siloxane resin is selected from the group consisting of polymethylsiloxane, polyphenylsiloxane, polymethylphenyl-siloxane, polydimethylsiloxane, polydiphenylsiloxane, poly(dimethylsiloxane-co-methylphenylsiloxane), and combinations thereof.

Optionally, the siloxane resin has a general chemical structure $[(Si(Me2)-O-)x(Si(Ph2)-O-)y(Si(R2)-O-)z]$, wherein R is independently selected from a hydroxyl group and an alkyl group, and wherein x, y, and z are integers. The ratio of x:y may be from about 1:10 to about 10:1.

Optionally, the substance of interest includes at least one of an explosive, an energetic material, a taggant, a narcotic, a toxin, a chemical warfare agent, a biological warfare agent, a pollutant, a pesticide, a toxic industrial chemical, a toxic industrial material, a homemade explosive, a pharmaceutical trace contaminant and combinations thereof.

The present specification also discloses a method for detecting a substance of interest, the method comprising: collecting a substance of interest on a collection device, wherein the collection device comprises an inert fiber material and a siloxane resin; heating the collection device in a desorber, wherein heating the device releases the substance of interest from the device; performing an analysis of the substance of interest; and detecting the substance of interest.

Optionally, the fiber material of the collection device comprises at least one of a woven and a non-woven glass material.

Optionally, the siloxane resin of the collection device comprises at least one substituent selected from the group consisting of methyl, phenyl, and hydroxyl groups. Optionally, the flexibility of the collection device is decreased as a ratio of phenyl to methyl groups in the siloxane resin is increased.

Optionally, heating the collection device in a desorber comprises heating the desorber to a desorption temperature of up to about 450° C.

Optionally, the fiber material of the collection device is coated with a concentration of from about 10% to about 80% of the siloxane resin, by weight of the collection device.

Optionally, the siloxane resin is selected from the group consisting of poly-(methylsiloxane), poly-(phenylsiloxane), poly-(methylphenylsiloxane), poly-(dimethylsiloxane), poly-(diphenyl siloxane), poly-(dimethylsiloxane-co-methylphenylsiloxane), and combinations thereof.

Optionally, the siloxane resin has a general chemical structure $[(Si(Me2)-O-)x(Si(Ph2)-O-)y(Si(R2)-O-)z]$, wherein R is independently selected from a hydroxyl group and an alkyl group, and wherein x, y, and z are integers.

Optionally, the substance of interest includes at least one of an explosive, an energetic material, a taggant, a narcotic, a toxin, a chemical warfare agent, a biological warfare agent, a pollutant, a pesticide, a toxic industrial chemical, a toxic industrial material, a homemade explosive, a pharmaceutical trace contaminant and combinations thereof.

Optionally, detecting the substance of interest comprises detecting the substance of interest using at least one of an ion mobility spectrometer (IMS), an ion trap mobility spectrometer (ITMS), a drift spectrometer (DS), an aspiration ion mobility spectrometer, a non-linear drift spectrometer, a field ion spectrometer (FIS), a radio frequency ion mobility increment spectrometer (IMIS), a field asymmetric ion mobility spectrometer (FAIMS), an ultra-high-field FAIMS, a differential ion mobility spectrometer (DIMS), a differential mobility spectrometer (DMS), a drift spectrometer, a non-linear drift spectrometer, a trapped ion mobility spectrometer (TIMS), a traveling wave ion mobility spectrometer, a semiconductor gas sensor, a raman spectrometer, a laser diode detector, a mass spectrometer (MS), a gas chromatograph (GC), an electron capture detector, a photoionization detector, a chemiluminescence-based detector, an electrochemical sensor, an infrared spectrometer, a lab-on-a-chip detector and combinations thereof.

The present specification also discloses a system for detecting a substance of interest, the system comprising: a collection device comprising an inert fiber material and a siloxane resin, wherein the collection device is configured to collect a substance of interest; an inlet configured to receive the collection device including the substance of interest; a desorber configured to heat the collection device to release the substance of interest; and an analysis device coupled in flow communication with the inlet and the desorber, wherein the analysis device is configured to perform an analysis on the substance of interest.

Optionally, the fiber material of the collection device comprises at least one of a woven and a non-woven glass material.

Optionally, the desorber is configured to heat the collection device to a temperature of up to about 450° C.

Optionally, the siloxane resin of the collection device comprises at least one substituent selected from the group consisting of methyl, phenyl, and hydroxyl groups. Optionally, the flexibility of the collection device is decreased as a ratio of phenyl to methyl groups in the siloxane resin is increased.

Optionally, the fiber material of the collection device is coated with a concentration of from about 10% to about 80% of the siloxane resin, by weight of the collection device.

Optionally, the siloxane resin of the collection device is selected from the group consisting of polymethylsiloxane, polyphenylsiloxane, polymethylphenyl-siloxane, polydimethylsiloxane, polydiphenylsiloxane, poly(dimethylsiloxane-co-methylphenylsiloxane), and combinations thereof.

Optionally, the siloxane resin of the collection device has a general chemical structure [(Si(Me2)-O-)x(Si(Ph2)-O-)y (Si(R2)-O-)z], wherein R is independently selected from a hydroxyl group and an alkyl group, and wherein x, y, and z are integers.

Optionally, the substance of interest includes at least one of an explosive, an energetic material, a taggant, a narcotic, a toxin, a chemical warfare agent, a biological warfare agent, a pollutant, a pesticide, a toxic industrial chemical, a toxic industrial material, a homemade explosive, a pharmaceutical trace contaminant and combinations thereof.

Optionally, the analysis device includes at least one of an ion mobility spectrometer (IMS), an ion trap mobility spectrometer (ITMS), a drift spectrometer (DS), an aspiration ion mobility spectrometer, a non-linear drift spectrometer, a field ion spectrometer (FIS), a radio frequency ion mobility increment spectrometer (IMIS), a field asymmetric ion mobility spectrometer (FAIMS), an ultra-high-field FAIMS, a differential ion mobility spectrometer (DIMS), a differential mobility spectrometer (DMS), a drift spectrometer, a non-linear drift spectrometer, a trapped ion mobility spectrometer (TIMS), a traveling wave ion mobility spectrometer, a semiconductor gas sensor, a raman spectrometer, a laser diode detector, a mass spectrometer (MS), a gas chromatograph (GC), an electron capture detector, a photoionization detector, a chemiluminescence-based detector, an electrochemical sensor, an infrared spectrometer, a lab-on-a-chip detector and combinations thereof.

In one embodiment of the present disclosure, a collection device for collecting a substance of interest is disclosed. The collection device includes an inert fiber material and a siloxane resin.

In another embodiment of the present disclosure, a method for detecting a substance of interest is disclosed. The method includes collecting a substance of interest on a collection device, wherein the collection device comprises an inert fiber material and a siloxane resin. The method also includes heating the collection device in a desorber, wherein heating the device releases the substance of interest from the device. The method further includes performing an analysis of the substance of interest and detecting the substance of interest.

In yet another embodiment of the present disclosure, a system for detecting a substance of interest is disclosed. The system includes a collection device comprising an inert fiber material and a siloxane resin, wherein the collection device is configured to collect a substance of interest. The system also includes an inlet configured to receive the collection device including the substance of interest. The system further includes a desorber configured to heat the collection device to release the substance of interest and an analysis device coupled in flow communication with the inlet and the desorber, wherein the analysis device is configured to perform an analysis on the substance of interest.

The aforementioned and other embodiments of the present shall be described in greater depth in the drawings and detailed description provided below.

BRIEF DESCRIPTION OF THE DRAWINGS

These and other features and advantages of the present specification will be further appreciated, as they become better understood by reference to the following detailed description when considered in connection with the accompanying drawings.

DETAILED DESCRIPTION

Trace detection systems are utilized for analyzing, detecting, and identifying various substances of interest, such as explosives and narcotics. In some embodiments of the present disclosure, a collection device is used to collect a sample containing a substance of interest. The collection device is thermally stable over a wide temperature range and when heated to a suitable temperature (e.g., in a desorber) will release the substance of interest for subsequent analysis and detection. In some embodiments, the substance of interest includes at least one of an explosive, an energetic material, a taggant, a narcotic, a toxin, a chemical warfare agent, a biological warfare agent, a pollutant, a pesticide, a toxic industrial chemical, a toxic industrial material, a homemade explosive, a pharmaceutical trace contaminant and combinations thereof.

As described herein, the collection device is comprised of an inert fiber material and a siloxane resin. The inert fiber material is thermally stable at high temperatures and can withstand high desorption temperatures within a trace detection system (e.g., up to 450° C.). In some embodiments, the inert fiber material is a woven or a non-woven fiber material. In some embodiments, the inert fiber material is a woven or non-woven glass material, such as a fiberglass material. In these embodiments, no pre-treatment or surface modification of the glass material is required prior to coating the material with the siloxane resin. In some embodiments, the fiber material is coated with a concentration of from about 10% to about 80%, from about 20% to about 70%, from about 30% to about 60%, or from about 45% to about 55% of a siloxane resin, by weight of the collection device. For example, a 10 g collection device may comprise siloxane resin in a range of approximately 1 g to 8 g and a corresponding inert fiber material in a range of approximately 9 g to 2 g.

In some embodiments, various collection devices have a shape having a sample collection area in a range of 0.5 square inches to 10 square inches. For example, a quadrilateral having some sides in a range of 0.5 inches to 1.5 inches and some sides in a range of 2 inches to 5 inches, i.e. a rectangle with widths in a range of 0.5 inches to 1.5 inches and lengths in a range of 2 inches to 5 inches, which would yield a minimum area of 1 square inch to a maximum area of 7.5 square inches. In another embodiment, the shape is defined by a diameter that ranges from 1 inches to 3 inches, e.g. a circle with a diameter in a range of 2 inches to 2.5 inches, which yields an area of approximately 8 square inches. It is therefore preferable to have a collection device with a first side corresponding to a substance collection surface and the opposing side corresponding to a holding surface. The substance collection surface preferably has a minimum area of 0.5 square inches to a maximum area of 10 square inches.

The coating may be applied by any means known in the art, without departing from the scope of the present disclosure, such as through covalent bonding and physisorption. In some embodiments, the device includes more than one, more than two, more than three, or more than four coatings. In some embodiments, the device includes a partial amount of the coating, meaning that the trap can include the coating and other materials (e.g., Teflon™).

In accordance with the present disclosure, the siloxane resin comprises a siloxane polymer, such as a siloxane having at least one substituent selected from the group consisting of methyl, phenyl, and hydroxyl groups. In some embodiments, the at least one substituent is selected from the group consisting of methyl, phenyl, hydroxyl, and alkyl groups. For instance, the siloxane resin is selected from the group consisting of polymethylsiloxane, polyphenylsiloxane, polymethylphenyl-siloxane, polydimethylsiloxane, polydiphenylsiloxane, poly(dimethylsiloxane-co-methylphenylsiloxane), and combinations thereof.

In some embodiments, the siloxane resin has a general chemical structure $[(Si(Me_2)-O-)_x(Si(Ph_2)-O-)_y(Si(R_2)-O-)_z]$, wherein R is independently selected from a hydroxyl group, an aryl group and an alkyl group, and wherein x, y, and z are integers. The ratio of methyl to phenyl (ratio of x:y) in the siloxane resin affects both thermal stability and flexibility of the collection device. In some embodiments, the flexibility of the collection device is decreased as a ratio of phenyl to methyl groups (ratio of y:x) in the siloxane resin is increased. In accordance with the present disclosure, the ratio of x:y is from about 1:10 to about 10:1, from about 1:5 to about 5:1, from about 1:3 to about 3:1, or about 1:1. In some embodiments, additional hydroxyl substituents in the siloxane resins (i.e., a higher z value when at least one R group is a hydroxyl group) contribute to improved polymer chain growth as well as cross-linking between polymer chains.

The collection device is configured to release the substance of interest when heated, such as in a desorber, wherein 'release' is defined as a detectable quantity of a substance of interest leaving the collection device and being detected by a detection system. The collection device described herein is thermally stable up to a temperature of about 450° C. A desorption temperature at which a substance of interest is released is dependent, at least in part, upon the volatility of the particular substance of interest. For instance, certain explosives have a low volatility and require desorption temperatures up to about 450° C. for release from the collection device and to enable detection. Therefore, the thermal stability of the collection device has significant importance in the successful detection of various substances of interest. In some embodiments, the substance of interest includes at least one of an explosive, an energetic material, a taggant, a narcotic, a toxin, a chemical warfare agent, a biological warfare agent, a pollutant, a pesticide, a toxic industrial chemical, a toxic industrial material, a homemade explosive, a pharmaceutical trace contaminant and combinations thereof.

In order to detect a substance of interest, a sample containing the substance of interest is collected on the collection device and heated in a desorber. The collection device comprises an inert fiber material and a siloxane resin, as described herein. Catalysts are included in the production of the collection device to begin the polymerization of the siloxane resin but are removed during the manufacturing process. The substance of interest is released from the collection device by heating the desorber to a temperature of up to about 450° C. The substance of interest is subsequently analyzed and detected. In some embodiments, a trace detection system is utilized for detecting the substance of interest. In these embodiments, the trace detection system comprises a collection device as described herein, an inlet configured to receive the collection device, a desorber configured to heat the collection device, and an analysis device coupled in flow communication with the inlet and the desorber, wherein the analysis device is configured to perform an analysis on the substance of interest.

The substance of interest can be analyzed and/or detected using at least one of an ion mobility spectrometer (IMS), a reverse ion mobility spectrometer, an ion trap mobility spectrometer (ITMS), a drift spectrometer (DS), an aspiration ion mobility spectrometer, a non-linear drift spectrometer, a field ion spectrometer (FIS), a radio frequency ion mobility increment spectrometer (IMIS), a field asymmetric ion mobility spectrometer (FAIMS), an ultra-high-field FAIMS, a differential ion mobility spectrometer (DIMS), a differential mobility spectrometer (DMS), a trapped ion mobility spectrometer (TIMS), a traveling wave ion mobility spectrometer, a semiconductor gas sensor, a raman spectrometer, a laser diode detector, a mass spectrometer (MS), a gas chromatograph (GC), an electron capture detector, a photoionization detector, a chemiluminescence-based detector, an electrochemical sensor, an infrared spectrometer, a lab-on-a-chip detector and combinations thereof.

The present specification is directed towards multiple embodiments. The following disclosure is provided in order to enable a person having ordinary skill in the art to practice the invention. Language used in this specification should not be interpreted as a general disavowal of any one specific embodiment or used to limit the claims beyond the meaning of the terms used therein. The general principles defined herein may be applied to other embodiments and applications without departing from the spirit and scope of the invention. Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

In the description and claims of the application, each of the words "comprise" "include" and "have", and forms thereof, are not necessarily limited to members in a list with which the words may be associated. It should be noted herein that any feature or component described in association with a specific embodiment may be used and implemented with any other embodiment unless clearly indicated otherwise.

As used herein, the indefinite articles "a" and "an" mean "at least one" or "one or more" unless the context clearly dictates otherwise.

Figure 1:
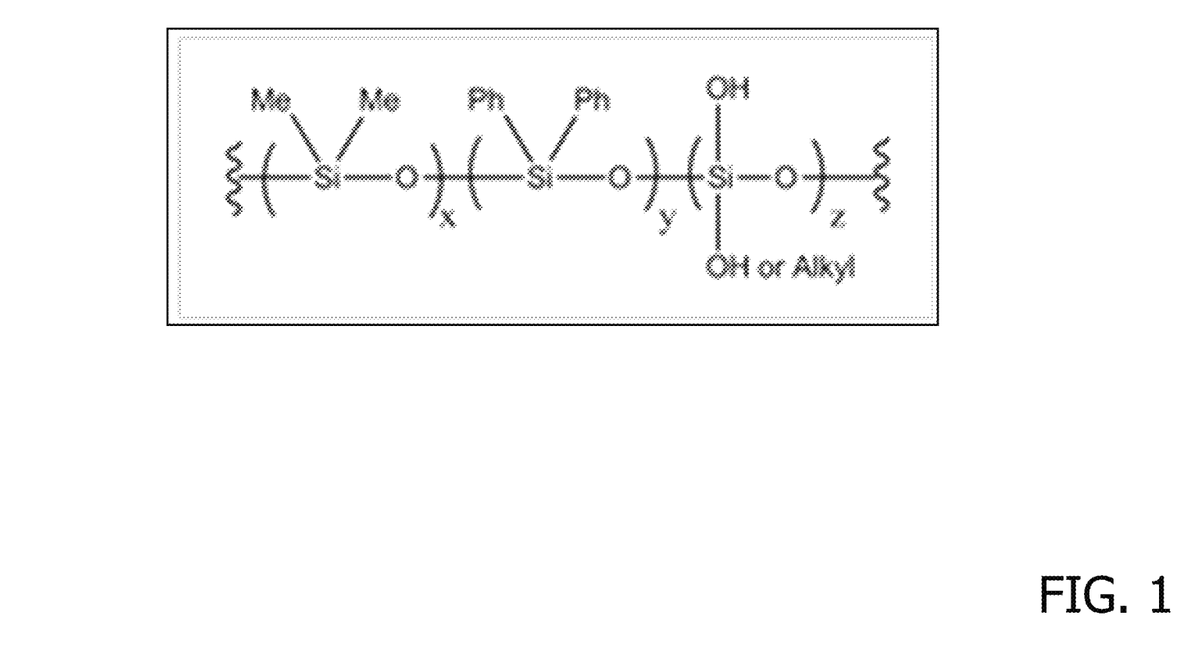
FIG. 1 is an exemplary embodiment of a general chemical structure of a siloxane resin in accordance with the present disclosure.

FIG. 1 is an exemplary embodiment of a general chemical structure of a siloxane resin in accordance with the present disclosure. FIG. 1 shows a monomeric unit for the siloxane polymer comprising the siloxane resin used to coat an inert fiber material, resulting in the collection device described herein. The general chemical structure is $[(Si(Me_2)-O-)_x(Si(Ph_2)-O-)_y(Si(R_2)-O-)_z]$, wherein R is independently selected from a hydroxyl group, an aryl group and an alkyl group, and wherein x, y, and z are integers such as zero and above. That is, the siloxane polymer has at least one substituent selected from the group consisting of phenyl, hydroxyl, aryl and alkyl groups. In some embodiments, the siloxane polymer has at least one substituent that is a methyl or a methyl group. Accordingly, in some embodiments, the siloxane resin is selected from the group consisting of polymethylsiloxane, polyphenylsiloxane, polymethylphenyl-siloxane, polydimethylsiloxane, polydiphenylsiloxane, poly(dimethylsiloxane-co-methylphenylsiloxane), and combinations thereof.

The substituent groups of the siloxane resin have an effect on both the thermal stability and flexibility of the resulting collection device. In particular, thermal stability and flexibility of the collection device changes with respect to the ratio of methyl to phenyl (ratio of x:y) present in the siloxane resin. In accordance with the present disclosure, the ratio of x:y is from about 1:5 to about 5:1, from about 1:3 to about 3:1, from about 1:2 to about 2:1, or about 1:1. In some embodiments, the flexibility of the collection device is decreased as a ratio of phenyl to methyl groups (y:x) in the siloxane resin is increased (or as the ratio x:y is increased). In some embodiments, additional hydroxyl substituents in the siloxane resins (i.e., siloxane resins having higher z values when at least one R group is a hydroxyl group) contribute to improved polymer chain growth as well as cross-linking between polymer chains. In some embodiments, siloxane resins having higher z values (when at least one R group is a hydroxyl group) also contribute to thermal stability and flexibility of the collection device. In some embodiments, the z value ranges from 1-10, with reference to x and y ranging from 1-10. Z values approaching and including 10 define higher values contributing to improved polymer chain growth and cross-linking, resulting in greater thermal stability and flexibility.

Figure 2:
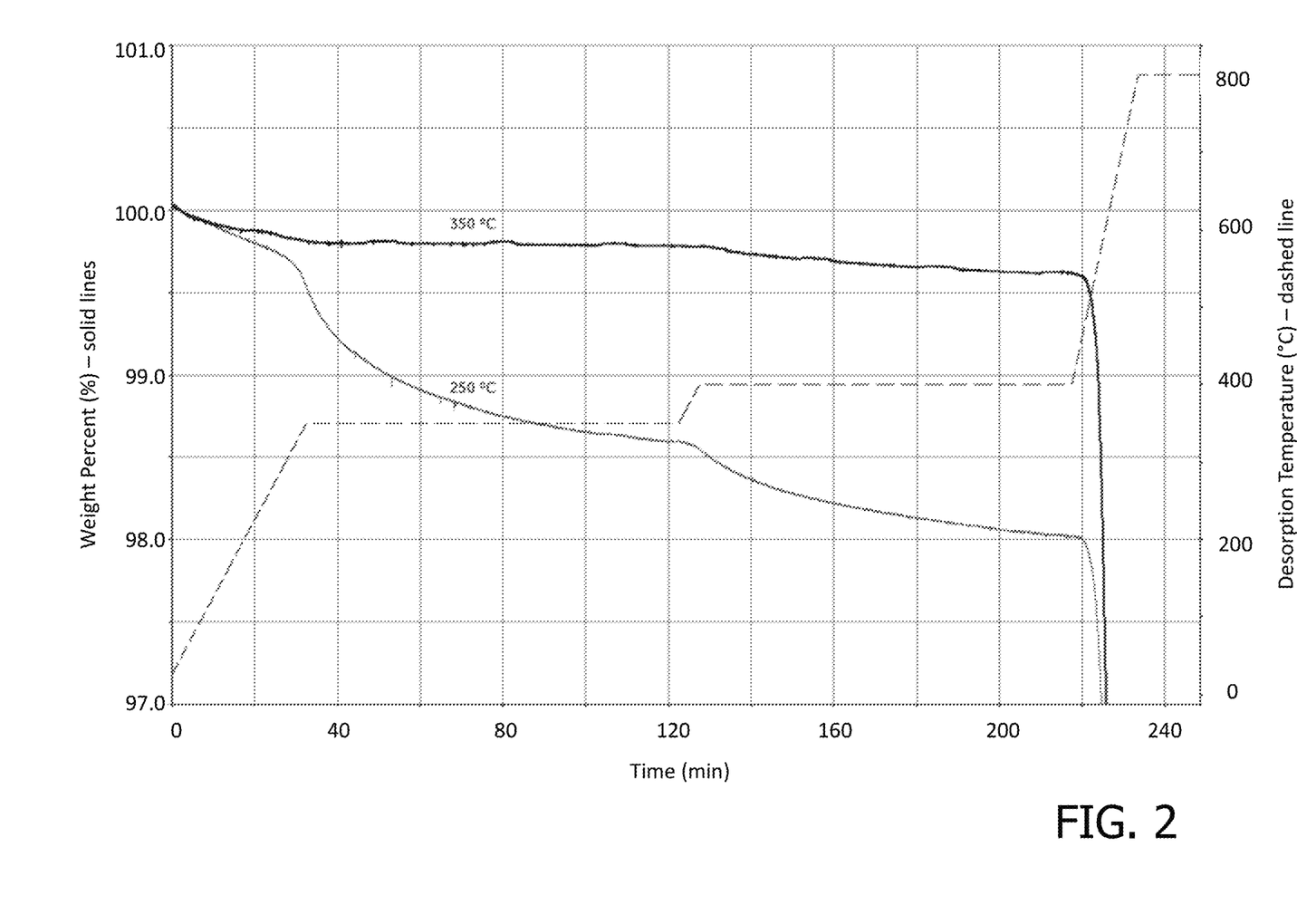
FIG. 2 is an exemplary embodiment of a graphical depiction of the thermal stability profile of an exemplary collection device based on curing temperature, in accordance with the present disclosure.

FIG. 2 is an exemplary embodiment of a graphical depiction of the thermal stability profile of an exemplary collection device based on curing temperature, in accordance with the present disclosure. In some embodiments, the coated fiber material is subsequently cured by heating. Higher curing temperatures promote more cross-linking between siloxane molecules, and consequently increase thermal stability of the resulting collection device. In some embodiments, curing the coated fiber material is facilitated by a catalyst. In various embodiments, the curing temperatures for a coated fiber material is in a range of 250° C. to 400° C. In some embodiments, the curing temperature is dependent on the mixture of materials comprising the coated fiber material. FIG. 2 shows the change in weight percent with increasing desorption temperature of an exemplary collection device that was cured at either about 250° C. or about 350° C. The upper solid line represents weight percent (according to the left-hand y-axis) over time of the collection device that was cured at about 350° C., while the lower solid line represents weight percent (according to the left-hand y-axis) over time of the collection device that was cured at about 250° C. The dashed line represents desorption temperature (according to the right-hand y-axis) over time. Thermal stability of the collection device is indicated by little to no change in weight percent over a given temperature range. Thermal decomposition of the collection device is indicated by significant change in weight percent (e.g., a steep slope in the weight percent profile) over a given temperature range. With respect to both the about 250° C.-cured and about 350° C.-cured collection devices, weight percent change is minimal (i.e., <5 wt. %) for temperatures up to about 450° C., after which thermal decomposition occurs rapidly for temperatures above about 450° C. In some embodiments, thermal stability is defined as a weight percent change equal to a loss of 10% or less of weight but, more preferably, 5% or less, and any numerical increment therein, for temperatures up to about 450° C. Therefore, both the about 250° C.-cured collection device and the about 350° C.-cured collection device are stable for desorption temperatures up to about 450° C. In some embodiments, 450° C. is the maximum threshold temperature at which the collection device reliably functions. In some embodiments, the collection device becomes thermally unstable at temperatures above 450° C.

Figure 3:
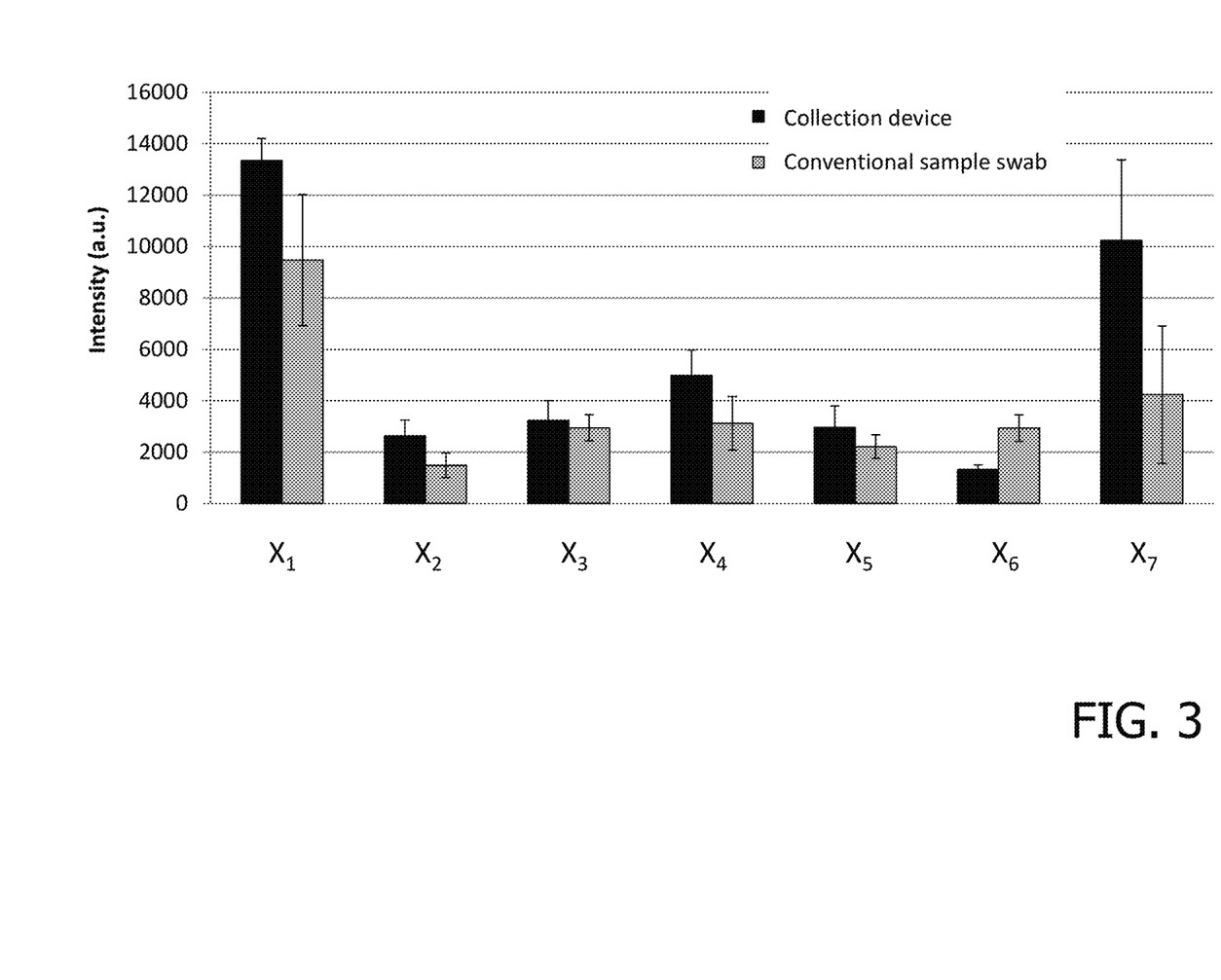
FIG. 3 is an exemplary embodiment of detection responses for various substances of interest collected on an exemplary collection device versus a conventional sample swab, in accordance with the present disclosure.

FIG. 3 is an exemplary embodiment of detection responses for various substances of interest collected on an exemplary collection device versus a conventional sample swab, in accordance with the present disclosure. FIG. 3 shows 7 different explosive-type substances of interest (labeled $X_1$-$X_7$), each collected on a respective collection device or conventional sample swab, and detected by a trace detection system. For every substance except $X_6$ (due to desorption issues), the collection device exhibited an improved detection response (as indicated by higher response intensity) over the conventional sample swab. For example, the detection response for $X_7$ as collected on the collection device was approximately 60% higher than the detection response for $X_7$ as collected on the conventional sample swab. Accordingly, the collection device described herein is overall more effective for detection of explosive-type substances of interest than a conventional sample swab.

Figure 4:
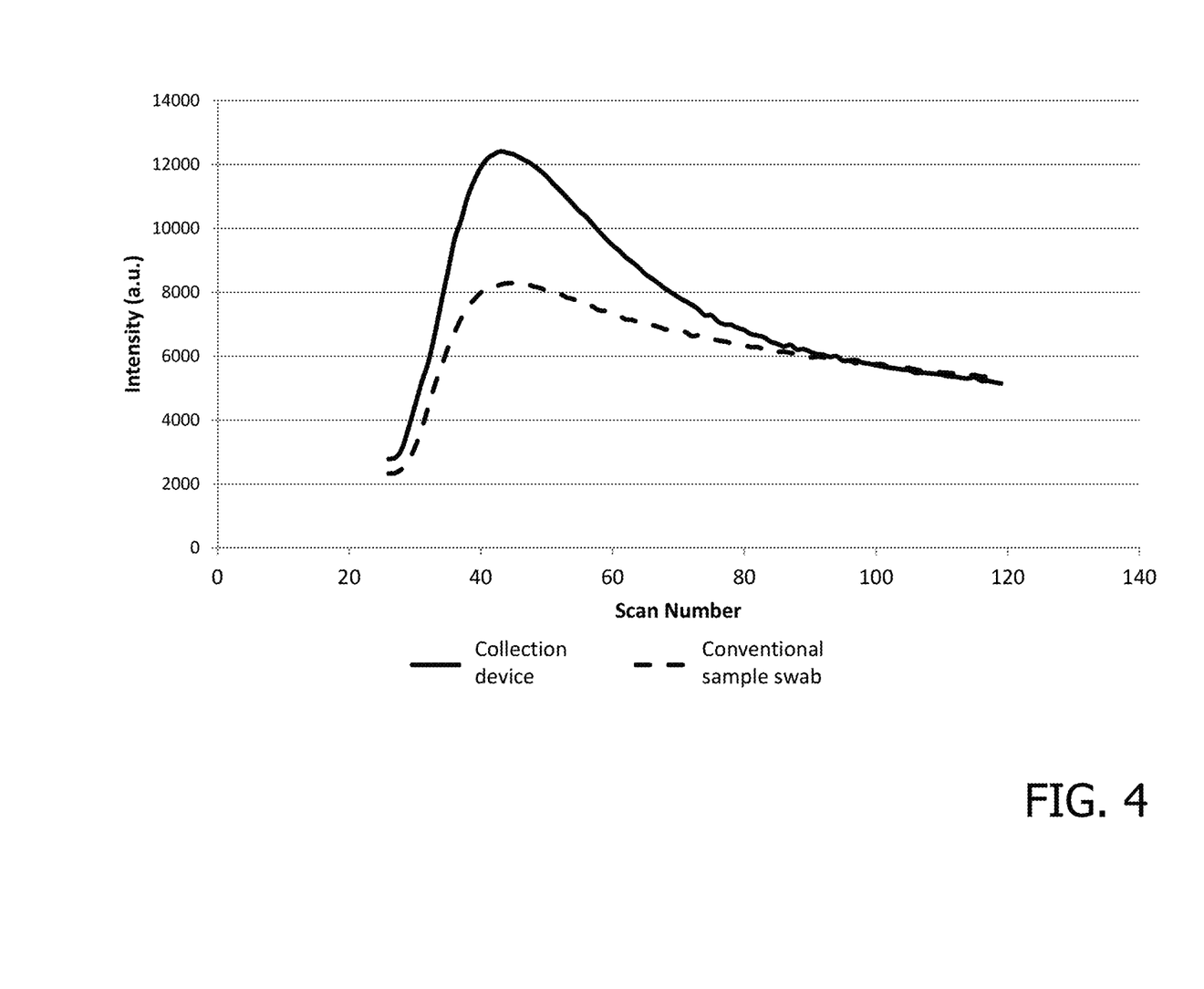
FIG. 4 is an exemplary embodiment of desorption profiles for a substance of interest collected on an exemplary collection device versus a conventional sample swab, in accordance with the present disclosure.

FIG. 4 is an exemplary embodiment of desorption profiles for a substance of interest collected on an exemplary collection device versus a conventional sample swab, in accordance with the present disclosure. Specifically, desorption profiles shown in FIG. 4 correspond to the substance of interest $X_7$, shown in FIG. 3. Over the course of the desorption cycle, the intensity response for $X_7$ reached a maximum intensity response between approximately 40 and 50 scan numbers, and the maximum response for the collection device was significantly higher (i.e., above 12000 arbitrary intensity units) than the maximum response for the conventional sample swab (i.e., about 8000 arbitrary intensity units). As shown in the figures, release of $X_7$ from the collection device during desorption is clearly more effective than release of $X_7$ from the conventional sample swab.

Figure 5:
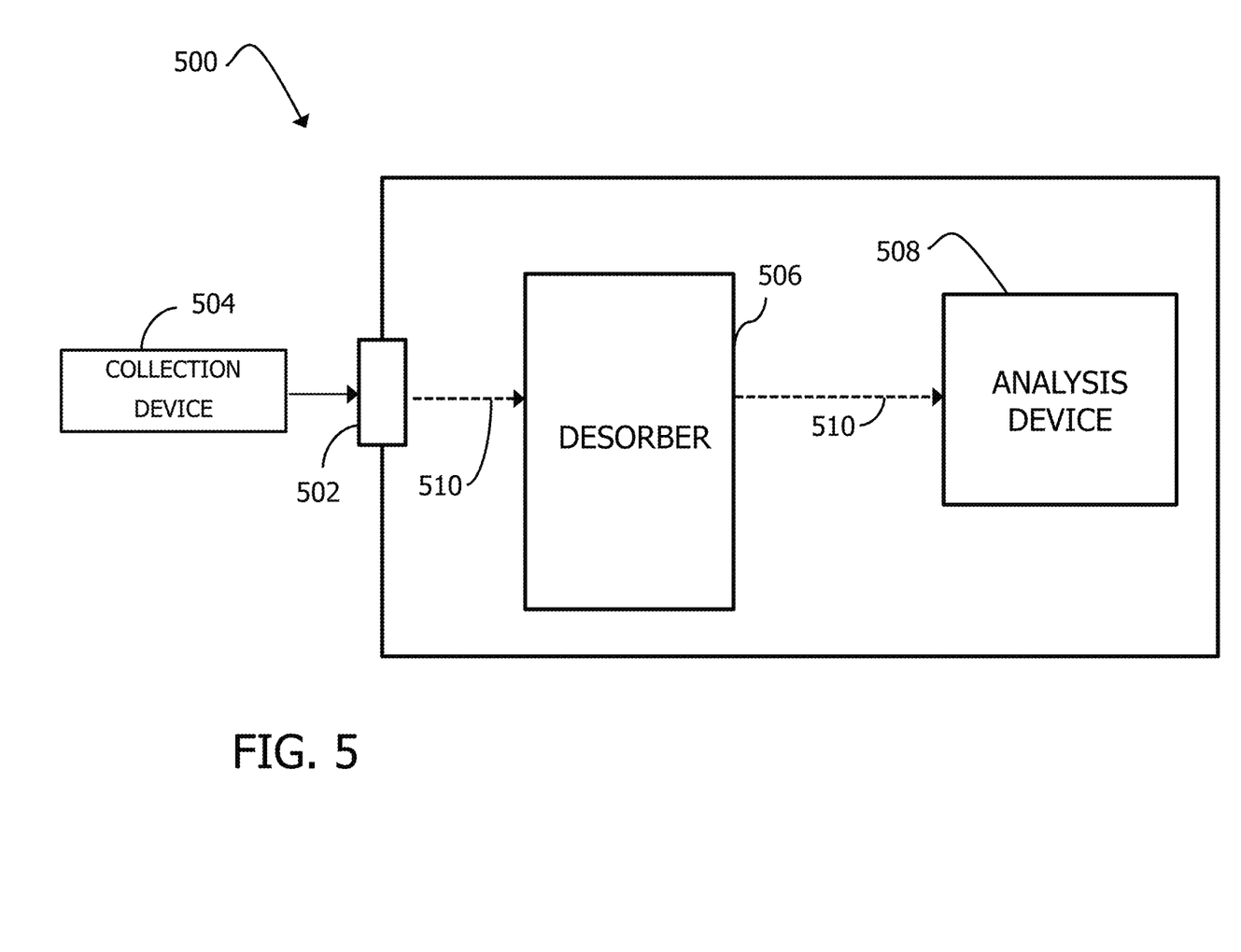
FIG. 5 is an exemplary embodiment of a block diagram of a trace detection system in accordance with the present disclosure.

FIG. 5 is an exemplary embodiment of a block diagram of a trace detection system in accordance with the present disclosure. System 500 includes an inlet 502 configured to receive a substance of interest, such as a substance of interest that has been collected on a collection device 504. Collection device 504 comprises an inert fiber material and a siloxane resin, as described herein. System 500 further includes a desorber 506 and an analysis device 508 in flow communication with one another and also in flow communication with inlet 502, as indicated by arrows 510. Once a sample containing a substance of interest has been collected on the collection device 504, the collection device 504 is inserted into the inlet 502 and subsequently into desorber 506. Desorber 506 is configured to heat the collection device 504 to release the substance of interest from the collection device 504. In some embodiments, the desorber 506 is heated up to a temperature about 450° C. Analysis device 508 is configured to perform an analysis on the substance of interest and detect the substance of interest.

In some embodiments of the present disclosure, the substance of interest detected by the detection system 500 includes at least one of an explosive, an energetic material, a taggant, a narcotic, a toxin, a chemical warfare agent, a biological warfare agent, a pollutant, a pesticide, a toxic industrial chemical, a toxic industrial material, a homemade explosive, a pharmaceutical trace contaminant, an inorganic salt, a nitrate, a chlorate, a perchlorate, a nitrite, a chlorite, a permanganate, a chromate, a dichromate, bromates, an iodate, and combinations thereof.

In some embodiments of the present disclosure, the analysis device 508 includes at least one of an ion mobility spectrometer (IMS), a reverse ion mobility spectrometer, an ion trap mobility spectrometer (ITMS), a drift spectrometer (DS), an aspiration ion mobility spectrometer, a non-linear drift spectrometer, a field ion spectrometer (FIS), a radio frequency ion mobility increment spectrometer (IMIS), a field asymmetric ion mobility spectrometer (FAIMS), an ultra-high-field FAIMS, a differential ion mobility spectrometer (DIMS), a differential mobility spectrometer (DMS), a trapped ion mobility spectrometer (TIMS), a traveling wave ion mobility spectrometer, a semiconductor gas sensor, a raman spectrometer, a laser diode detector, a mass spectrometer (MS), a gas chromatograph (GC), an electron capture detector, a photoionization detector, a chemiluminescence-based detector, an electrochemical sensor, an infrared spectrometer, a lab-on-a-chip detector, and combinations thereof.

Exemplary embodiments of detection systems for determining the presence of substances of interest, and methods of operating such systems are not limited to the specific embodiments described herein, but rather, components of systems and/or steps of the methods may be utilized independently and separately from other components and/or steps described herein. For example, the methods may also be used in combination with other systems requiring determining the presence of substances of interest, and are not limited to practice with only the substance detection systems and methods as described herein. Rather, the exemplary embodiment can be implemented and utilized in connection with many other substance detection applications that are currently configured to determine the presence of substances of interest.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

Some embodiments involve the use of one or more electronic or computing devices. Such devices typically include a processor or controller, such as a general purpose central processing unit (CPU), a graphics processing unit (GPU), a microcontroller, a reduced instruction set computer (RISC) processor, an application specific integrated circuit (ASIC), a programmable logic circuit (PLC), and/or any other circuit or processor capable of executing the functions described herein. The methods described herein may be encoded as executable instructions embodied in a computer readable medium, including, without limitation, a storage device and/or a memory device. Such instructions, when executed by a processor, cause the processor to perform at least a portion of the methods described herein. The above examples are exemplary only, and thus are not intended to limit in any way the definition and/or meaning of the term processor.

The above examples are merely illustrative of the many applications of the system and method of present specification. Although only a few embodiments of the present specification have been described herein, it should be understood that the present specification might be embodied in many other specific forms without departing from the spirit or scope of the specification. Therefore, the present examples and embodiments are to be considered as illustrative and not restrictive, and the specification may be modified within the scope of the appended claims.

We claim:

1. A system for detecting a substance of interest, the system comprising:

a collection device comprising an inert fiber material and a siloxane resin, wherein the collection device is configured to collect a substance of interest wherein the siloxane resin comprises at least one substituent selected from the group consisting of methyl groups, phenyl groups, and hydroxyl groups, and wherein a flexibility of the collection device is adapted to decrease as a ratio of phenyl groups to methyl groups in the siloxane resin increases;

an inlet configured to receive the collection device including the substance of interest;

a desorber configured to heat the collection device to release the substance of interest; and an analysis device coupled in flow communication with the inlet and the desorber, wherein the analysis device is configured to perform an analysis on the substance of interest.

2. The system of claim 1, wherein the fiber material of the collection device comprises at least one of a woven or a non-woven glass material.

3. The system of claim 1, wherein the desorber is configured to heat the collection device to a temperature of up to about 450° C.

4. The system of claim 1, wherein the fiber material of the collection device is coated with a concentration of from about 10% to about 80% of the siloxane resin, by weight of the collection device.

5. The system of claim 1, wherein the siloxane resin of the collection device is selected from the group consisting of polymethylsiloxane, polyphenylsiloxane, polymethylphenyl-siloxane, polydimethylsiloxane, polydiphenylsiloxane, poly(dimethylsiloxane-co-methylphenylsiloxane), and combinations thereof.

6. The system of claim 1, wherein the siloxane resin of the collection device has a general chemical structure [(Si(Me2)-O-)x(Si(Ph2)-O-)y(Si(R2)-O-)z], wherein R is independently selected from a hydroxyl group and an alkyl group, and wherein x, y, and z are integers.

7. The system of claim 1, wherein the substance of interest includes at least one of an explosive, an energetic material, a taggant, a narcotic, a toxin, a chemical warfare agent, a biological warfare agent, a pollutant, a pesticide, a toxic industrial chemical, a toxic industrial material, a homemade explosive, a pharmaceutical trace contaminant or combinations thereof.

8. The system of claim 1, wherein the analysis device includes at least one of an ion mobility spectrometer (IMS), an ion trap mobility spectrometer (ITMS), a drift spectrometer (DS), an aspiration ion mobility spectrometer, a non-linear drift spectrometer, a field ion spectrometer (FIS), a radio frequency ion mobility increment spectrometer (IMIS), a field asymmetric ion mobility spectrometer (FAIMS), an ultra-high-field FAIMS, a differential ion mobility spectrometer (DIMS), a differential mobility spectrometer (DMS), a drift spectrometer, a non-linear drift spectrometer, a trapped ion mobility spectrometer (TIMS), a traveling wave ion mobility spectrometer, a semiconductor gas sensor, a raman spectrometer, a laser diode detector, a mass spectrometer (MS), a gas chromatograph (GC), an electron capture detector, a photoionization detector, a chemiluminescence-based detector, an electrochemical sensor, an infrared spectrometer, a lab-on-a-chip detector or combinations thereof.

9. A system for detecting a substance of interest, the system comprising:

a collection device comprising an inert fiber material and a siloxane resin, wherein the collection device is configured to collect a substance of interest, wherein the siloxane resin has a general chemical structure [(Si(Me2)-O-)x(Si(Ph2)-O-)y(Si(R2)-O-)z], wherein R is independently selected from a hydroxyl group and an alkyl group, and wherein x, y, and z are integers;

an inlet configured to receive the collection device including the substance of interest;

a desorber configured to heat the collection device to release the substance of interest; and an analysis device coupled in flow communication with the inlet and the desorber, wherein the analysis device is configured to perform an analysis on the substance of interest.

10. The system of claim 9, wherein the fiber material of the collection device comprises at least one of a woven or a non-woven glass material.

11. The system of claim 9, wherein the desorber is configured to heat the collection device to a temperature of up to about 450° C.

12. The system of claim 9, wherein the siloxane resin of the collection device comprises at least one substituent selected from the group consisting of methyl groups, phenyl groups, and hydroxyl groups.

13. The system of claim 12, wherein a flexibility of the collection device is adapted to decrease as a ratio of phenyl groups to methyl groups in the siloxane resin increases.

14. The system of claim 9, wherein the fiber material of the collection device is coated with a concentration of from about 10% to about 80% of the siloxane resin, by weight of the collection device.

15. The system of claim 9, wherein the siloxane resin of the collection device is selected from the group consisting of polymethylsiloxane, polyphenylsiloxane, polymethylphenyl-siloxane, polydimethylsiloxane, polydiphenylsiloxane, poly(dimethylsiloxane-co-methylphenylsiloxane), and combinations thereof.

16. The system of claim 9, wherein the substance of interest includes at least one of an explosive, an energetic material, a taggant, a narcotic, a toxin, a chemical warfare agent, a biological warfare agent, a pollutant, a pesticide, a toxic industrial chemical, a toxic industrial material, a homemade explosive, a pharmaceutical trace contaminant or combinations thereof.

17. The system of claim 9, wherein the analysis device includes at least one of an ion mobility spectrometer (IMS), an ion trap mobility spectrometer (ITMS), a drift spectrometer (DS), an aspiration ion mobility spectrometer, a non-linear drift spectrometer, a field ion spectrometer (FIS), a radio frequency ion mobility increment spectrometer (IMIS), a field asymmetric ion mobility spectrometer (FAIMS), an ultra-high-field FAIMS, a differential ion mobility spectrometer (DIMS), a differential mobility spectrometer (DMS), a drift spectrometer, a non-linear drift spectrometer, a trapped ion mobility spectrometer (TIMS), a traveling wave ion mobility spectrometer, a semiconductor gas sensor, a raman spectrometer, a laser diode detector, a mass spectrometer (MS), a gas chromatograph (GC), an electron capture detector, a photoionization detector, a chemiluminescence-based detector, an electrochemical sensor, an infrared spectrometer, a lab-on-a-chip detector or combinations thereof.

* * * * *